(12) United States Patent
Ma et al.

(10) Patent No.: US 11,770,059 B2
(45) Date of Patent: Sep. 26, 2023

(54) VIBRATION MOTOR

(71) Applicant: AAC Microtech (Changzhou) Co., Ltd., Changzhou (CN)

(72) Inventors: Jie Ma, Shenzhen (CN); Lubin Mao, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 136 days.

(21) Appl. No.: 17/533,149

(22) Filed: Nov. 23, 2021

(65) Prior Publication Data
US 2022/0200431 A1 Jun. 23, 2022

(30) Foreign Application Priority Data
Dec. 22, 2020 (CN) .......................... 202023125715.X

(51) Int. Cl.
*H02K 33/16* (2006.01)
*H02K 33/18* (2006.01)
*H02K 1/34* (2006.01)
*H02K 5/04* (2006.01)

(52) U.S. Cl.
CPC ............... *H02K 33/16* (2013.01); *H02K 1/34* (2013.01); *H02K 33/18* (2013.01); *H02K 5/04* (2013.01)

(58) Field of Classification Search
CPC .......... H02K 33/16; H02K 1/34; H02K 33/18; H02K 5/04
See application file for complete search history.

(56) References Cited

U.S. PATENT DOCUMENTS

2019/0222106 A1* 7/2019 Liu ..................... H02K 33/06

FOREIGN PATENT DOCUMENTS

CN 209200903 U * 8/2019 ............. H02K 33/16

OTHER PUBLICATIONS

CN-209200903-U_translated (Year: 2019).*

* cited by examiner

*Primary Examiner* — Tulsidas C Patel
*Assistant Examiner* — Mohammed Ahmed Qureshi
(74) *Attorney, Agent, or Firm* — W&G Law Group

(57) ABSTRACT

The present invention provides a vibration motor including an installation housing having a through opening; a vibrator; an elastic member suspending the vibrator; a stator; a magnet; a coil; and a flexible circuit board. The flexible circuit board includes a first conduction part, a second conduction part, and a bending part. The vibration motor further comprises a connection bracket having a first connection part connected to the vibrator and a second connection part connected to the elastic member. By virtue of the configuration described in the invention, the assembly accuracy of the vibration motor is ensured.

5 Claims, 7 Drawing Sheets

VIBRATION MOTOR

FIELD OF THE PRESENT DISCLOSURE

The present disclosure relates to motors, in particular to a vibration motor for providing tactile feedback.

DESCRIPTION OF RELATED ART

With the development of electronic technology, portable consumer electronic products are becoming more and more popular, such as mobile phones, handheld game consoles, navigation devices or handheld multimedia entertainment devices. These electronic products generally use a vibration motor for system feedback. For example, mobile phone call reminders, navigation reminders, and vibration feedback from game consoles.

The vibration motor comprises an installation housing, a vibrator, a stator, and an elastic member, the elastic member is used to suspend the vibrator in the installation housing. In the prior art, the elastic member is added with a bending part parallel to the end of the iron core, and a through hole is opened on the bending part, and the two ends of the iron core pass through the through hole of the elastic member, and then the iron core and the elastic member are riveted and fixed. However, when this connection method is adopted, the structural complexity of the elastic member increases, which in turn causes manufacturing difficulties.

SUMMARY OF THE PRESENT INVENTION

One of the objects of the present invention is to provide a vibration motor with simplified elastic member and enabling easier manufacturing.

To achieve the above-mentioned objects, the present invention provides a vibration motor having an installation housing; a vibrator accommodated in the installation housing; an elastic member suspending the vibrator in the installation housing; a stator fixed to the installation housing for driving the vibrator to vibrate; a magnet engaging with one of the vibrator and the stator; and a coil corresponding to the magnet engaging with the other of the vibrator and the stator The vibration motor further comprises a connection bracket having a first connection part connected to the vibrator and a second connection part connected to the elastic member.

In addition, the vibration motor comprises two first connection parts and two second connection parts, wherein the vibrator comprises an iron core attached to the coil; the two first connection parts are respectively fixed to two ends of the iron core along a long axis of the iron core; the two second connection parts are respectively fixed to two ends of the elastic member.

In addition, the first connection part comprises two connection arms separately provided on both sides of the iron core along a short axis of the iron core; the second connection part is connected between the two connection arms; the elastic member comprises two elastic sheets arranged on both sides of the iron core along the short axis of the iron core and a connection sheet connected between the two elastic sheet; the second connection part is fixedly connected to the connection sheet.

In addition, the two connection arms and the second connection part have U-shaped structures.

In addition, the connection bracket further comprises a third connection part connecting the two second connection parts and the connection sheet.

In addition, the vibrator further comprises a fastener fixed at the end of the iron core and connected to the third connection part.

In addition, the third connection part includes a clipping opening; the fastener comprises a fastening part connected between the iron core and the third connection part and a clipping position part extending from the fastening part into the clipping opening.

In addition, the fastener further comprises a placement part extending from the fastening part toward the end surface of the iron core and located between the iron core and the second connection part.

In addition, one end of the connection arm is fixed to the iron core, and the other end of the connection arm is fixed to the placement part.

In addition, the first connection part, the second connection part, and the placement part are all coplanar with the end surface of the iron core.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
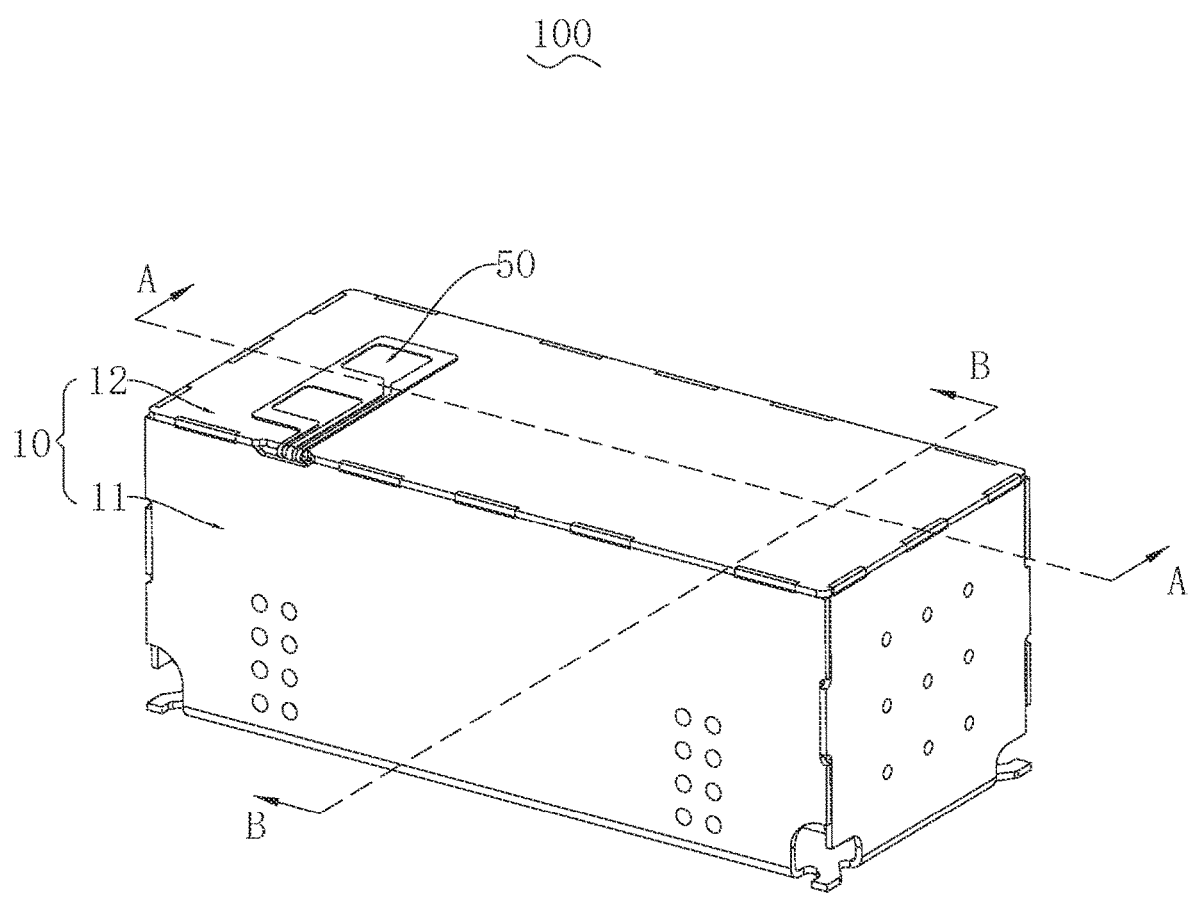
FIG. 1 is an isometric and assembled view of a vibration motor in accordance with an exemplary embodiment of the present disclosure.

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby is only to explain the disclosure, not intended to limit the disclosure.

In the following, the present disclosure will be further explained in conjunction with the drawings and embodiments. Referring to FIGS. 1-5, a vibration motor 100 comprises an installation housing 10, a vibrator 20 accommodated in the installation housing 10, an elastic member 40 suspends the vibrator 20 in the installation housing 10, and a stator 30 fixed to the installation housing 10 for driving the vibrator 20 to vibrate. One of the vibrator 20 and the stator 30 is provided with a magnet 31, and the other is provided with a coil 22 that matches the magnet 31. The vibration motor 100 also comprises a connection bracket 60. The connection bracket 60 comprises a first connection part 61 connected to the vibrator 20 and a second connection part 62 connected to the elastic member 40.

In the present invention, by adding a connection bracket 60, the first connection part 61 of the connection bracket 60 is fixedly connected to the vibrator 20. The second connection part 62 of the connection bracket 60 is fixedly connected to the elastic member 40. Thus, the connection between the elastic member 40 and the vibrator 20 is realized. Using the connection bracket 60 of this technical solution, the connection between the elastic member 40 and the vibrator 20 can be realized quickly and simply. It is not needed to increase the additional structural parts of the elastic member 40. It solves the technical problems in the prior art that the elastic member 40 is connected to the vibrator 20, which causes the structural complexity of the elastic member 40 to increase and manufacturing difficulties.

It should be noted that the connection bracket 60 can be made of high-strength materials such as metal materials.

Figure 8:
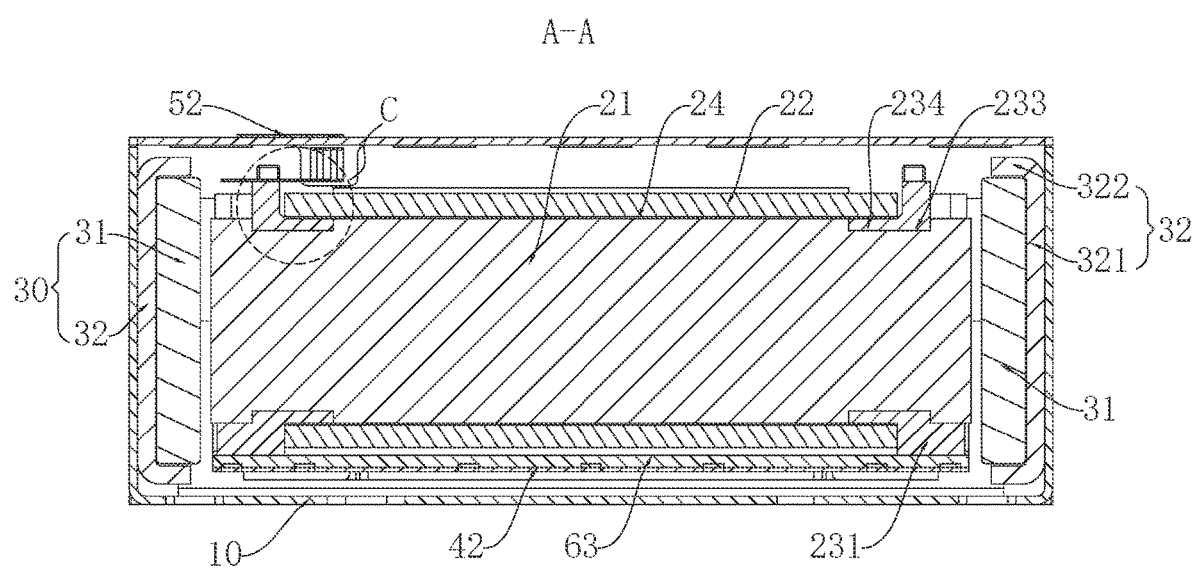
FIG. 8 is a cross-sectional view of the vibration motor taken along line AA in FIG. 1.

Wherein, with reference to FIG. 8, the vibrator 20 comprises an iron core 21 and a coil 22 wound on the iron core 21. The stator 30 comprises two magnets 31 respectively arranged at both ends of the iron core 21 along the long axis of the iron core 21. When the coil 22 is energized, a magnetic field is generated, which interacts with the magnetic field of the magnet 31 to drive the vibrator 20 to vibrate.

In addition, the stator 30 also comprises a magnetic frame 32 fixed on the installation housing 10 for fixing the magnet 31. The magnetic frame 32 comprises a frame plate 321 and a plurality of position limiting claws 322 extending from the frame plate 321 toward the magnet 31. And several position limiting claw 322 surround magnet 31.

Figure 3:
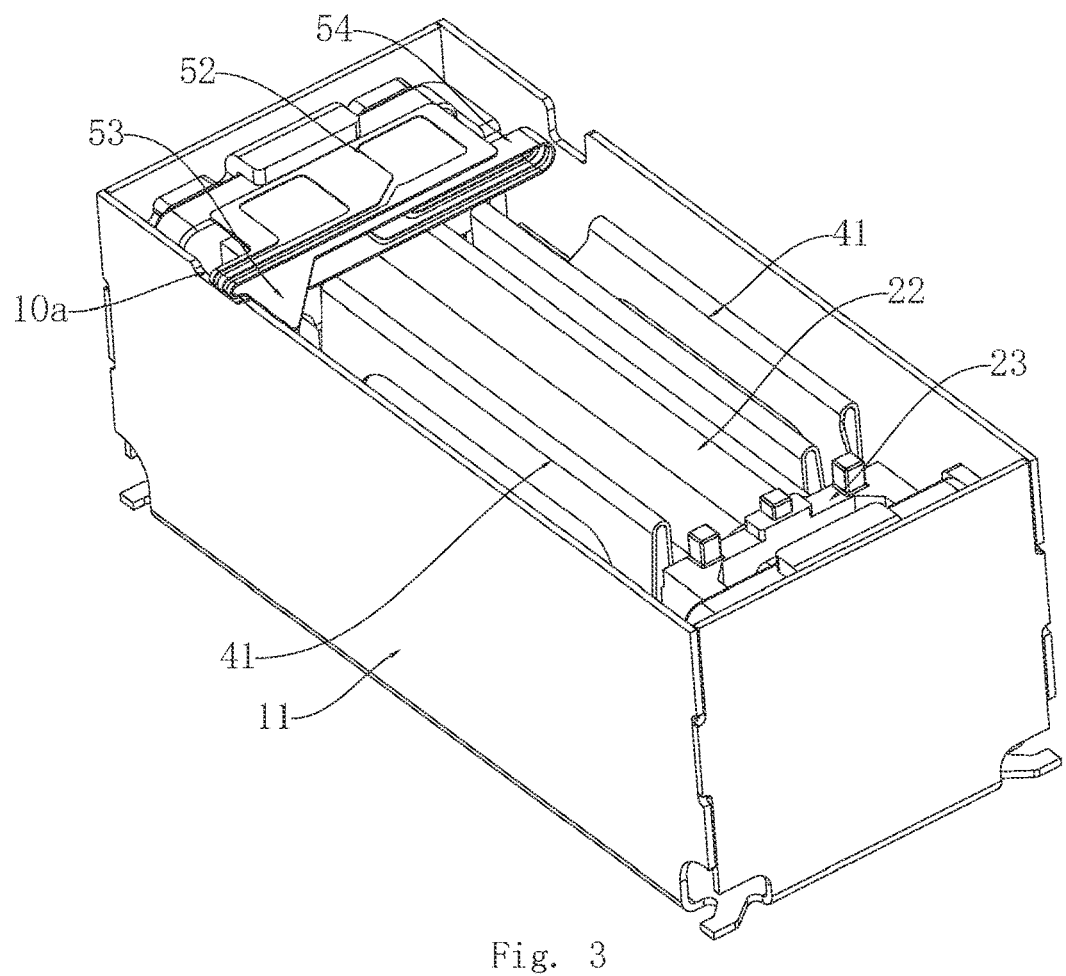
FIG. 3 is an isometric and partially assembled view of the vibration motor in FIG. 1.
Figure 4:
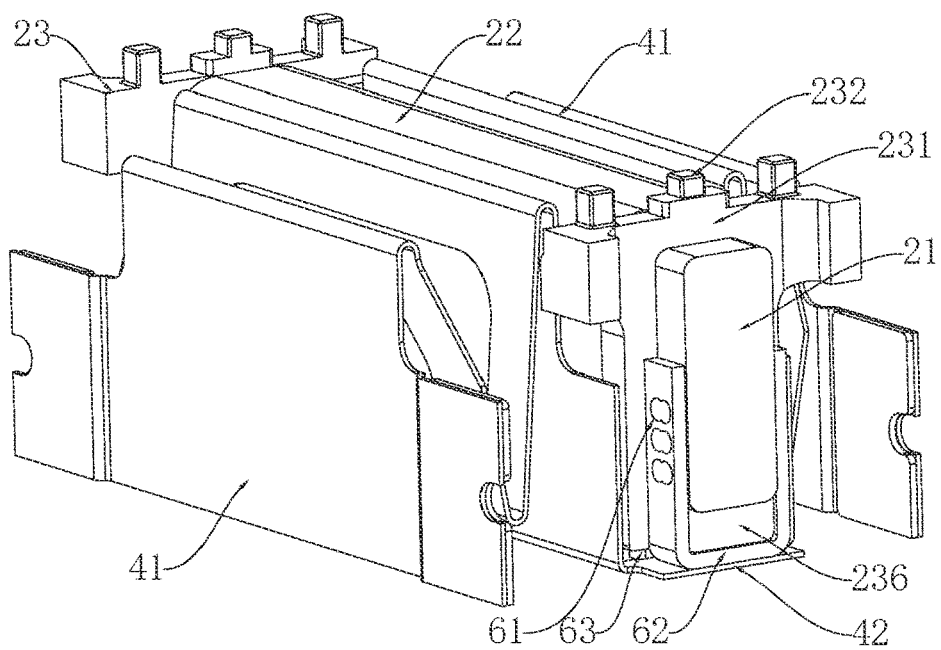
FIG. 4 is an isometric and partially assembled view of the vibration motor in FIG. 1 with an installation housing thereof removed.
Figure 5:
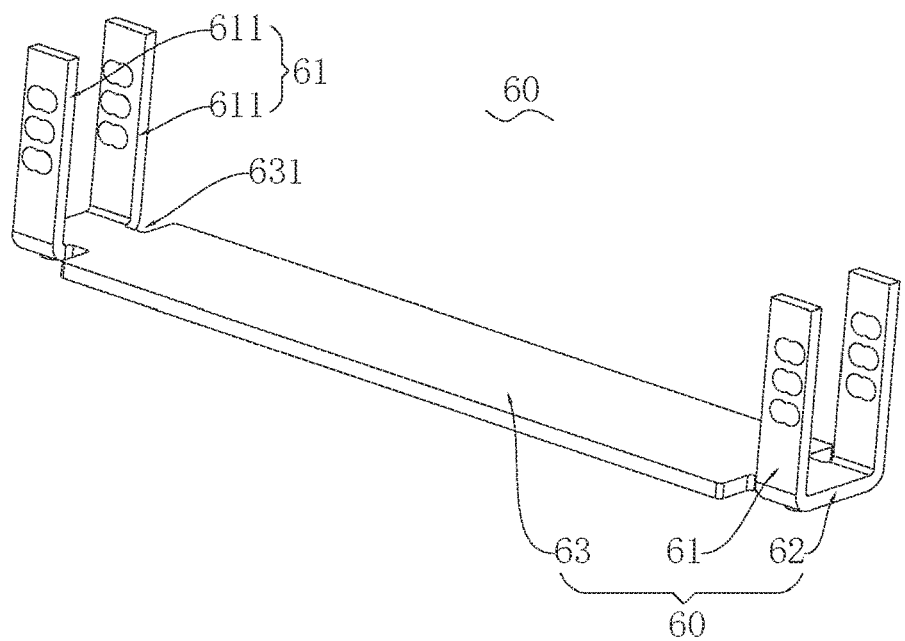
FIG. 5 is an isometric view of a connection bracket of the vibration motor.

Refer to FIGS. 3-5 for details. In an embodiment, the number of the first connection part 61 and the second connection part 62 are both two. The two first connection parts 61 are respectively fixed to the two ends of the iron core 21 along the long axis of the iron core 21. Two second connection parts 62 are fixed to the two ends of the elastic member 40 respectively. Two first connection parts 61 and two second connection parts 62 are used to support and connect the two ends of the iron core 21 and the two ends of the elastic member 40 respectively to improve the balance and stability of the connection between the elastic member 40 and the iron core 21 as a whole.

In an embodiment, the first connection part 61 comprises two connection arms 611 arranged on both sides of the iron core 21 along the short axis of the iron core 21. The second connection part 62 is connected between the two connection arms 611. The elastic member 40 comprises two elastic sheets 41 arranged on both sides of the iron core 21 along the short axis of the iron core 21 and a connection sheet 42 connected between the two elastic sheets 41. Wherein, the second connection part 62 is fixedly connected to the connection sheet 42. The two connection arms 611 of the first connection part 61 are fixed on both sides of the iron core 21 along the short axis of the iron core 21 to improve the connection stability of the connection bracket 60 and the iron core 21. Connect the second connection part 62 between the two connection arms 611. And fix the connection sheet 42 of the elastic member 40 with the second connection part 62. Thus improve the stability of the connection between the connection bracket 60 and the elastic member 40. Thus, the reliability of the connection between elastic member 40 and iron core 21 is comprehensively improved.

In some specific embodiments, the two connection arms 611 and the second connection part 62 are U-shaped structures. That is, the second connection part 62 is connected between the two ends of the two connection arms 611 with the same direction.

In an embodiment, the connection bracket 60 further comprises a third connection part 63 connecting the two second connection parts 62. And the third connection part 63 is connected with a connection sheet 42. Through the third connection part 63, the two second connection parts 62 are connected together to realize the integrity of the connection bracket 60 and improve the overall stability of the connection bracket 60. At the same time, through the connection of the third connection part 63 and the connection sheet 42, the connection area between the elastic member 40 and the connection bracket 60 is increased, and the reliability of the connection between the elastic member 40 and the connection bracket 60 is improved.

Figure 6:
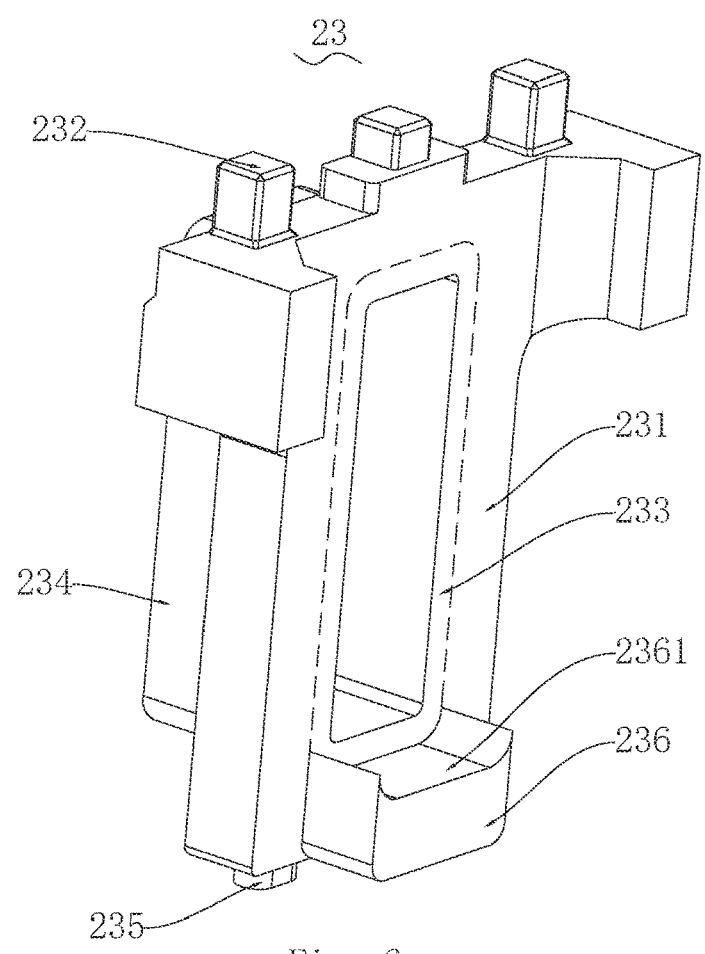
FIG. 6 is an isometric view of a fastener of the vibration motor.

With reference to FIG. 6, in an embodiment, the vibrator 20 further comprises a fastener 23 fixed at the end of the iron core 21. And the fastener 23 is connected with the third connection part 63, that is, the iron core 21 also realizes its further connection with the connection bracket 60 through the fastener 23. Preferably, two fasteners 23 are arranged, and the two fasteners 23 are respectively fixed on both ends of the iron core 21.

It should be noted that the fastener 23 is made of plastic to achieve insulation from the elastic circuit board 50, iron core 21, and the like.

In some specific embodiments, the iron core 21 and the fastener 23 are integrally formed, and the iron core 21 and the fastener 23 are integrally molded into a whole. Thus, the process is eliminated to assemble the fastener 23 and iron core 21 separately after injection molding, which not only improves the assembly efficiency, but also ensures the assembly accuracy.

Figure 9:
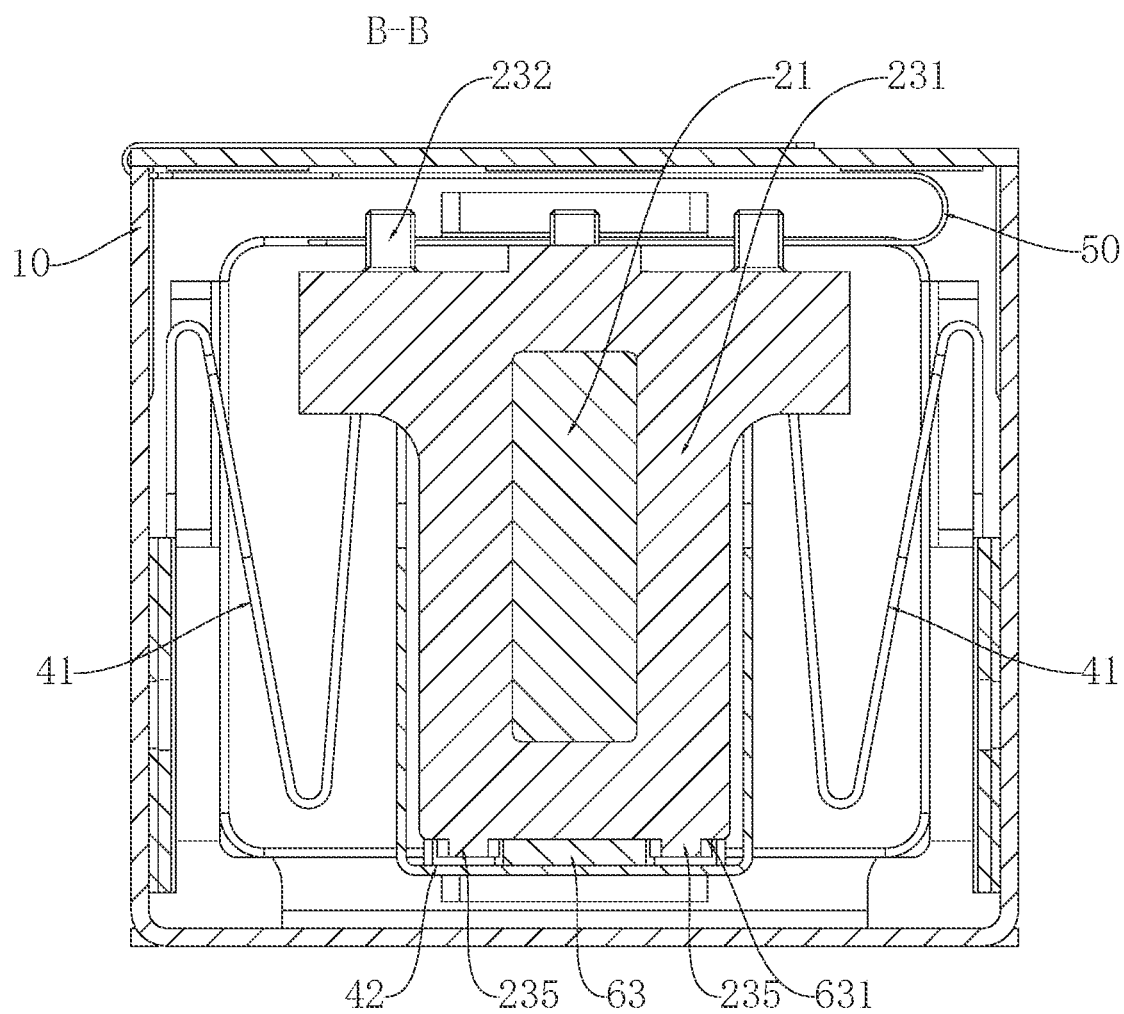
FIG. 9 is a cross-sectional view of the vibration motor taken along line BB in FIG. 1.

With reference to FIG. 9, in one embodiment, the third connection part 63 is provided with a clipping opening 631; the fastener 23 comprises a fastening part 231 connected between the iron core 21 and the third connection part 63 and a clipping opening 631 extending from the fasting part 231 into the clipping position part 235. Clip the clipping position part 235 of the fastener 23 into the clipping opening 631 of the third connection part 63 to locate the connection between the connection bracket 60 and the fastener 23, and at the same time strengthen the connection strength between the connection bracket 60 and the fastener 23.

In an embodiment, continuing to refer to FIGS. 4 and 5, the fastener 23 further comprises a placement part 236 formed by extending from the fastening part 231 toward the end surface of the iron core 21. Placement part 236 is located between iron core 21 and second connection part 62. The iron core 21 is supported by the placement part 236, and the placement part 236 is located between the iron core 21 and the second connection part 62. This improves the compactness of the overall structure of the vibrator 20, and at the same time improves the stability of the fastener 23 and the iron core 21 through the connection of the placement part 236 and the iron core 21. The connection between placement part 236 and second connection part 62 also improves the stability of fastener 23 and connection bracket 60. That indirectly improves the reliability of the connection between the connection bracket 60 and the iron core 21.

In some specific embodiments, referring to FIG. 6, the placement part 236 further is provided with a placement groove 2361. The specific shape of the placement groove 2361 is set according to the outer dimensions of the iron core 21 to support the iron core 21 in an adaptive manner.

In one embodiment, one end of the connection arm 611 is fixed to the iron core 21, and the other end of the connection arm 611 is fixed to the placement part 236. The connection arm 611 connects the iron core 21 and the placement part 236 at the same time, further improving the connection stability between the connection bracket 60, the iron core 21 and the fastener 23.

In some specific embodiments, the first connection part 61, the second connection part 62 and the placement part 236 are all flush with the end surface of the iron core 21. This improves the assembly aesthetics of the connection bracket 60, the iron core 21 and the fastener 23.

Figure 7:
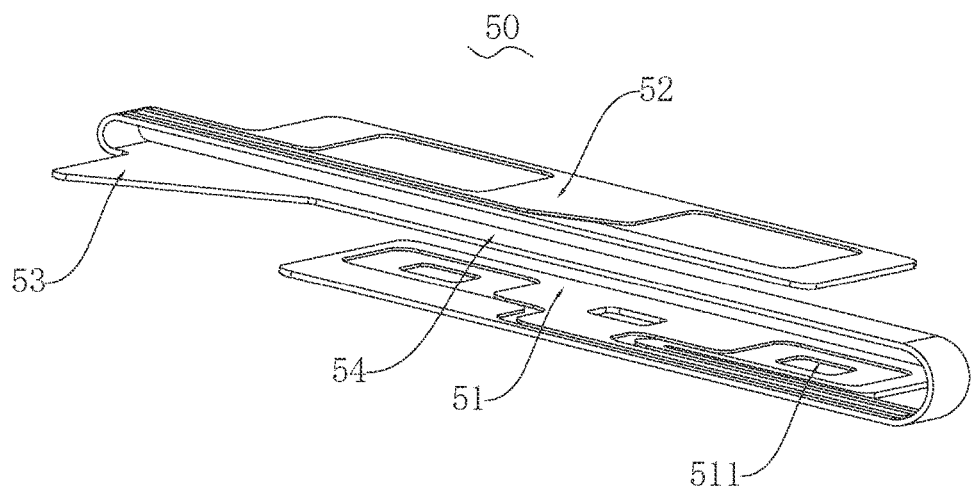
FIG. 7 is an isometric view of a flexible circuit board of the vibration motor.
Figure 10:
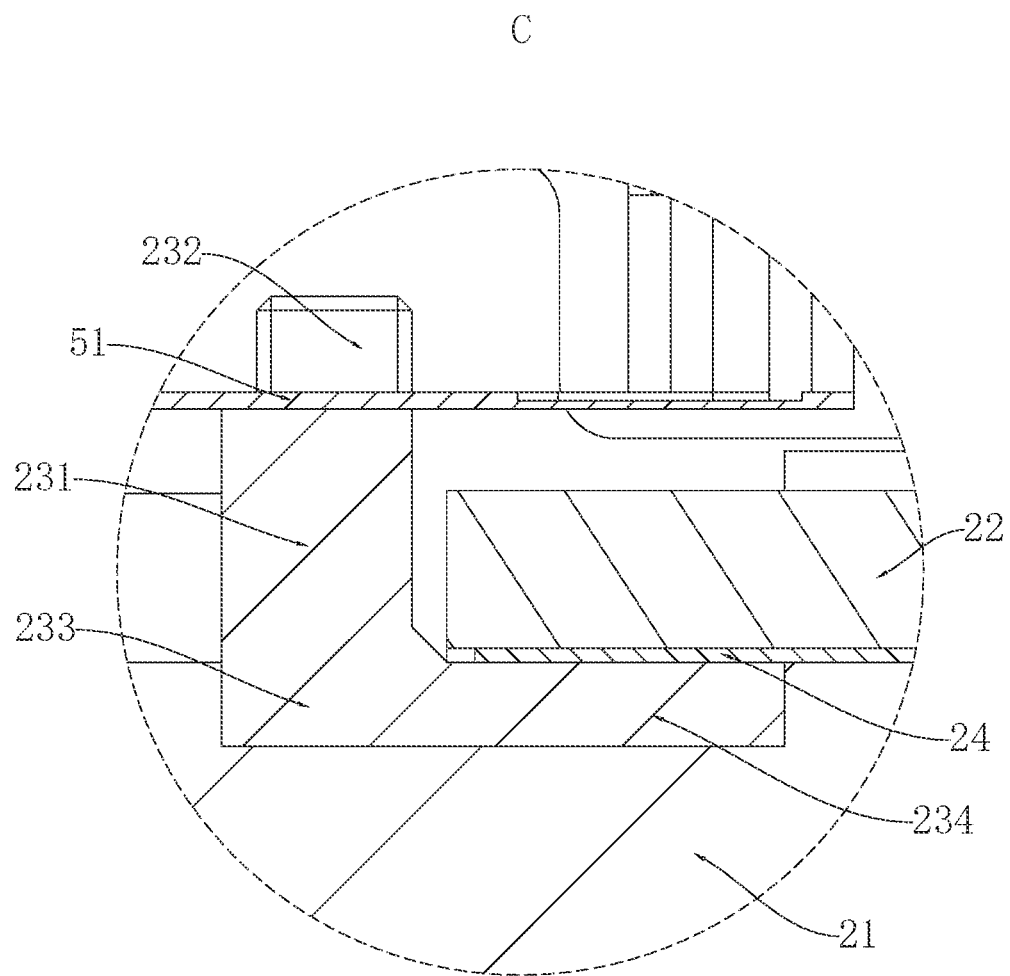
FIG. 10 is an enlarged view of circled part C in FIG. 8.

With reference to FIGS. 7-8 and 10, the vibration motor 100 further comprises an elastic circuit board 50 for electrically connecting with the coil 22. The elastic circuit board 50 is provided with a positioning port 511. The fastener 23 also comprises a positioning part 232 extending from the fastening part 231 into the positioning port 511. The fastener 23 is set on the iron core 21 through the fastening part 231 to achieve a stable connection with the iron core 21. The positioning part 232 extends into the positioning port 511 of the elastic circuit board 50 to achieve a stable connection with the elastic circuit board 50. Thus, the stable connection between the elastic circuit board 50 and the coil 22 is ensured.

In an embodiment, the iron core 21 is provided with a clipping slot 211; the fastener 23 further comprises a clipping part 233 extending from the fastening part 231 into the clipping slot 211. By inserting and connecting the clipping part 233 of the fastener 23 into the clipping slot 211 of the iron core 21, the connection strength between the fastener 23 and the iron core 21 is increased, and the stability of the connection between the fastener 23 and the iron core 21 is further ensured.

In one embodiment, the clipping slot 211 is a circular structure, that is, the clipping slot 211 is arranged along the circumference of the iron core 21. The integrity enhances the connection strength between the fastener 23 and the iron core 21. Correspondingly, the clipping part 233 is a circular structure and is connected to the clipping slot 211 with an adaptable card.

In an embodiment, the vibrator 20 further comprises an insulation film 24 sandwiched between the iron core 21 and the coil 22. That is, insulation film 24 is used for insulation between coil 22 and iron core 21. When the clipping part 233 of the fastener 23 extends into the clipping slot 211 of the iron core 21, the end of the insulation film 24 will not fully wrap the iron core 21, which will lead to poor insulation between the coil 22 and the iron core 21. Therefore, the fastener 23 also comprises an isolation part 234 extending from the clipping part 233 in the direction toward the coil 22. And the insulation film 24 extends to the isolation part 234 when the iron core 21 is coated. At least part of the isolation part 234 is covered, so as to avoid the risk of poor insulation between the coil 22 and the iron core 21 due to insufficient coating of end of the iron core 21 by the insulation film 24, thus to improve the reliability between the coil 22 and the iron core 21.

In some specific embodiments, the isolation part 234 is flush with the surface of the iron core 21 to maintain the aesthetics when the insulating film covers the iron core 21 and the isolation part 234.

In one embodiment, in conjunction with FIG. 3 and FIG. 7, the installation housing 10 is provided with a through opening 10a. The elastic circuit board 50 comprises a first conduction part 51 that is placed in the installation housing 10 for electrical connection with the coil 22, a second conduction part 52 that is placed outside the installation housing 10 via through opening 10a, and a position limiting part 53 located between the first conduction part 51 and the second conduction part 52. The position limiting part 53 is used to abut the inner wall surface of the installation housing 10 adjacent to the through opening 10a.

In this embodiment, the elastic circuit board 50 is electrically connected to the coil 22 through the first conduction part 51. The second conduction part 52 is electrically connected to an external circuit, thereby realizing the conduction of the elastic circuit board 50 to the coil 22. Wherein, the second conduction part 52 is led out via the through opening 10a and placed outside the installation housing 10. The position limiting part 53 is placed in the installation housing 10. When the lead-out range of the second conduction part 52 reaches the limit, the position limiting part 53 abuts on the inner wall surface of the installation housing 10 adjacent to the through opening 10a. That is, the position limiting part 53 restricts the lead-out range of the second conduction part 52 relative to the installation housing 10, which solves the problem that the size of the elastic circuit board 50 drawn out of the installation housing 10 in the prior art is not controlled and easily exceeds the traction range, and furthermore, the technical problem of assembly accuracy cannot be guaranteed.

Wherein, the positioning port 511 is opened on the first conduction part 51 to achieve a stable connection between the first conduction part 51 and the coil 22.

In one embodiment, the position limiting part 53 is a triangular structure to save the material of the elastic circuit board 50. At the same time, the specific direction of position limiting part 53 is set. Wherein, the top corner of position limiting part 53 is away from the through opening 10a, and the bottom edge of the position limiting part 53 is close to the through opening 10a. Thereby ensuring the abutment strength and abutment stability of position limiting part 53.

Preferably, the position limiting part 53 is provided with a right-angled triangle structure.

In one embodiment, the position limiting part 53 and the first conduction part 51 are parallel, so as to avoid spatial interference between the position limiting part 53 and the first conduction part 51. It should be noted that the positional relationship between position limiting part 53 and first conduction part 51 comprises and is not limited to being parallel to each other.

In one embodiment, the elastic circuit board 50 further comprises a bending part 54 connected between the first conduction part 51 and the second conduction part 52. Bending part 54 passes through the through opening 10a and connects with second conduction part 52. The flexible connection between the first conduction part 51 and the second conduction part 52 is realized through the bending part 54.

In one embodiment, the position limiting part 53 is located on the side of the bending part 54 away from the first conduction part 51. That is, the position limiting part 53 and the first conduction part 51 are divided into two sides of the bending part 54 to balance the traction force acting on the first conduction part 51.

In addition, in another embodiment, the position limiting part 53 is two. Two position limiting part 53 are located on both sides of the bending part 54. Or, the position limiting part 53 is located on the side of the bending part 54 close to the first conduction part 51.

In some specific embodiments, the first conduction part 51 and the second conduction part 52 are arranged in parallel, or the second conduction part 52 is perpendicular to the first conduction part 51.

Figure 2:
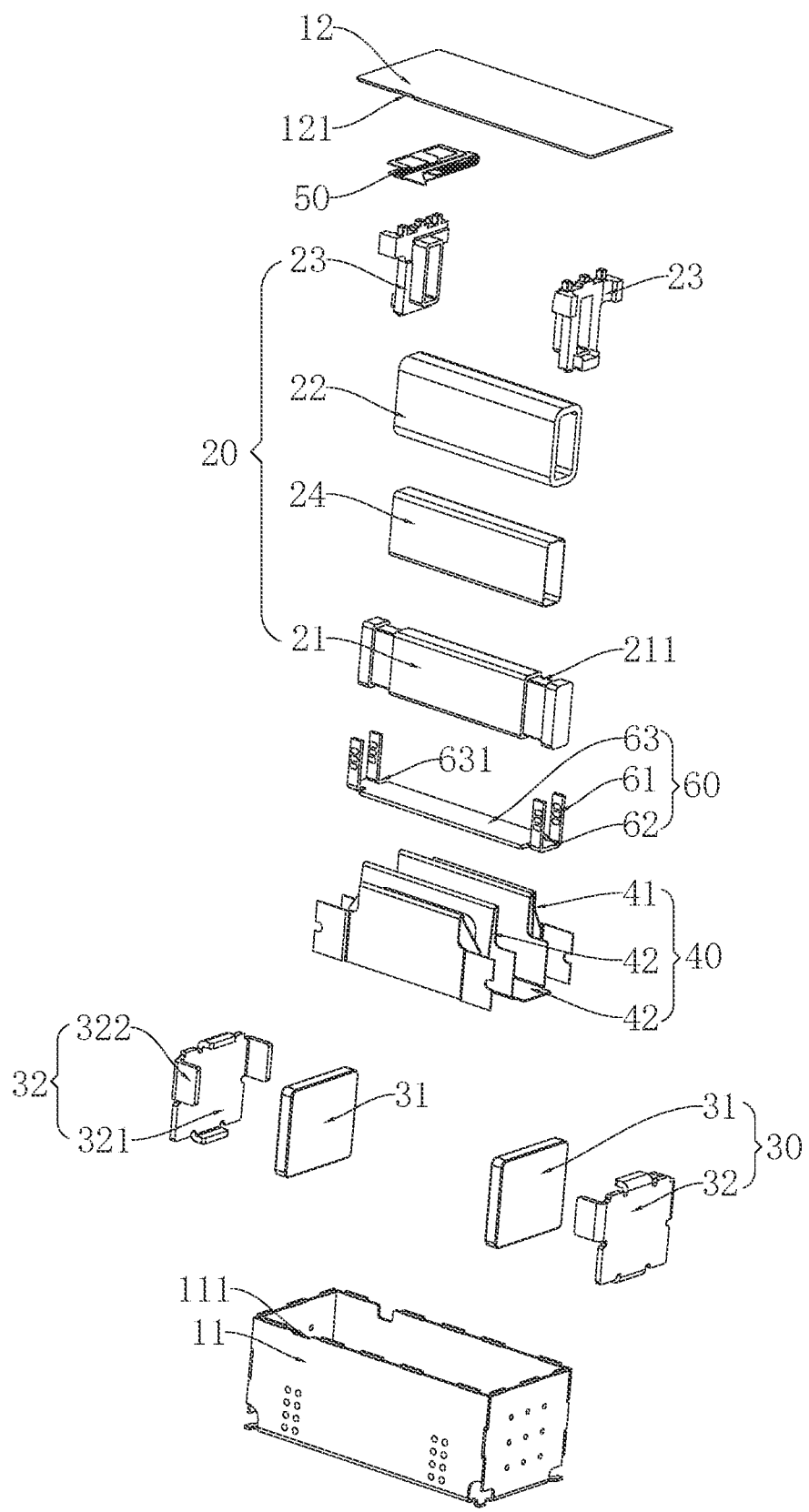
FIG. 2 is an exploded and isometric view of the vibration motor in FIG. 1.

In one embodiment, with reference to FIGS. 1-2, the installation housing 10 comprises a housing body 11 having an opening and a cover 12 covering the opening. The housing body 11 is provided with a first gap 111. The cover 12 is provided with a second gap 121. The first gap 111 and the second gap 121 form a through opening 10a.

Wherein, the second conduction part 52 is fixed on the cover 12; the position limiting part 53 abuts against the inner wall of the housing body 11.

It should be noted that the terms "first" and "second" in the description and claims of the present disclosure and the above-mentioned drawings are used to distinguish similar objects, and not necessarily used to describe a specific sequence or sequence. It should be understood that the data used in this way can be interchanged under appropriate circumstances, so that the embodiments of the present invention described herein can be implemented in a sequence other than those illustrated or described herein, for example. In addition, the terms "comprising" and "having" and any variations of them are intended to cover non-exclusive inclusions. For example, a process, method, system, product, or device that comprises a series of steps or units is not necessarily limited to those clearly listed steps or units. Instead, it may include other steps or units that are not clearly listed or are inherent to these processes, methods, products, or equipment.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor, comprising:
   an installation housing;
   a vibrator accommodated in the installation housing;
   an elastic member suspending the vibrator in the installation housing;
   a stator fixed to the installation housing for driving the vibrator to vibrate;
   a magnet engaging with one of the vibrator and the stator;
   a coil corresponding to the magnet engaging with the other of the vibrator and the stator; wherein
   the vibration motor further comprises a connection bracket having two first connection parts connected to the vibrator and two second connection parts connected to the elastic member;
   the vibrator comprises an iron core attached to the coil; the two first connection parts are respectively fixed to two ends of the iron core along a long axis of the iron core; the two second connection parts are respectively fixed to two ends of the elastic member;
   the first connection part comprises two connection arms separately provided on both sides of the iron core along a short axis of the iron core; the second connection part is connected between the two connection arms; the elastic member comprises two elastic sheets arranged on both sides of the iron core along the short axis of the iron core and a connection sheet connected between the two elastic sheet the second connection part is fixedly connected to the connection sheet;
   the connection bracket further comprises a third connection part connecting the two second connection parts and the connection sheet;
   the vibrator further comprises a fastener fixed at the end of the iron core and connected to the third connection part;
   the third connection part includes a clipping opening; the fastener comprises a fastening part connected between the iron core and the third connection part and a clipping position part extending from the fastening part into the clipping opening.

2. The vibration motor as described in claim 1, wherein the two connection arms and the second connection part have U-shaped structures.

3. The vibration motor as described in claim 1, wherein the fastener further comprises a placement part extending from the fastening part toward the end surface of the iron core and located between the iron core and the second connection part.

4. The vibration motor as described in claim 3, wherein one end of the connection arm is fixed to the iron core, and the other end of the connection arm is fixed to the placement part.

5. The vibration motor as described in claim 3, wherein the first connection part, the second connection part, and the placement part are all coplanar with the end surface of the iron core.

* * * * *